(12) United States Patent
Misoczki et al.

(10) Patent No.: US 11,575,521 B2
(45) Date of Patent: Feb. 7, 2023

(54) FAST XMSS SIGNATURE VERIFICATION AND NONCE SAMPLING PROCESS WITHOUT SIGNATURE EXPANSION

(71) Applicant: Intel Corporation, Santa Clara, CA (US)

(72) Inventors: Rafael Misoczki, Hillsboro, OR (US); Vikram Suresh, Portland, OR (US); David Wheeler, Chandler, AZ (US); Santosh Ghosh, Hillsboro, OR (US); Manoj Sastry, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 154 days.

(21) Appl. No.: 16/455,967

(22) Filed: Jun. 28, 2019

(65) Prior Publication Data
US 2019/0319800 A1 Oct. 17, 2019

(51) Int. Cl.
*H04L 9/32* (2006.01)
*H04L 9/06* (2006.01)

(52) U.S. Cl.
CPC .......... *H04L 9/3247* (2013.01); *H04L 9/0643* (2013.01); *H04L 9/0662* (2013.01); *H04L 9/3239* (2013.01)

(58) Field of Classification Search
None
See application file for complete search history.

(56) References Cited

U.S. PATENT DOCUMENTS

| 6,944,313 B1 | 9/2005 | Donescu |
| 2004/0228360 A1 | 11/2004 | Bae |
| 2007/0130470 A1 | 6/2007 | Blom et al. |
| 2007/0143826 A1 | 6/2007 | Sastry |

(Continued)

FOREIGN PATENT DOCUMENTS

| CN | 112152786 A | 12/2020 |
| CN | 112152788 A | 12/2020 |

(Continued)

OTHER PUBLICATIONS

Huelsing et al. "XMSS: extended Merkle Signature Scheme" [online] Internet Research Task Force, May 2018 [retrieved Mar. 26, 2021], Retrieved from the Internet: URL: https://tools.ietf.org/pdf/rfc8391.pdf (Year: 2018).*

(Continued)

*Primary Examiner* — Linglan Edwards
*Assistant Examiner* — Joshua Raymond White
(74) *Attorney, Agent, or Firm* — Jaffery Watson Mendonsa & Hamilton LLP

(57) ABSTRACT

In one example an apparatus comprises accelerator logic to pre-compute at least a portion of a message representative, hash logic to generate the message representative based on an input message, and signature logic to generate a signature to be transmitted in association with the message representative, the signature logic to apply a hash-based signature scheme to a private key to generate the signature comprising a public key, and determine whether the message representative satisfies a target threshold allocation of computational (Continued)

costs between a cost to generate the signature and a cost to verify the signature. Other examples may be described.

12 Claims, 14 Drawing Sheets

(56) References Cited

U.S. PATENT DOCUMENTS

| | | | |
|---|---|---|---|
| 2012/0008775 | A1 | 1/2012 | Natarajan |
| 2014/0019759 | A1 | 1/2014 | Burmester et al. |
| 2014/0037089 | A1 | 2/2014 | Itoh |
| 2015/0100785 | A1 | 4/2015 | Joye et al. |
| 2017/0331631 | A1 | 11/2017 | Peeters |
| 2018/0091309 | A1* | 3/2018 | Misoczki ............ H04L 9/3252 |
| 2020/0014535 | A1 | 1/2020 | Baskaran et al. |
| 2020/0177389 | A1 | 6/2020 | Tsuchida |
| 2021/0167945 | A1 | 6/2021 | Yamakawa et al. |

FOREIGN PATENT DOCUMENTS

| | | |
|---|---|---|
| EP | 3758278 A1 | 12/2020 |
| EP | 3758281 A1 | 12/2020 |

OTHER PUBLICATIONS

Perin et al. "Tuning the Winternitz hash-based digital signature scheme" [online] IEEE, Jun. 2018 [retrieved Mar. 26, 2021], Retrieved from the Internet: URL: https://ieeexplore.ieee.org/document/8538642 (Year: 2018).*

Yavux Attila Altay, et al., "Real-Time Digital Signatures for Time-Critical Networks", IEEE Transactions on Information Forensics and Security, IEEE, Piscataway NJ, US, vol. 12, No. 11, Nov. 1, 2017, pp. 2627-2639, XP011660596.

Communication—Extended European Search Report for EP Application 20161899.8, dated Aug. 20, 2020, 8 pages.

Communication Pursuant to Article 94(3) for EP Application No. 20161899.8 dated Mar. 16, 2021, 7 pages.

Communication—Extended European Search Report for EP Application No. 20162601.7, dated Sep. 16, 2020. 9 pages.

Wen Wang et al: "XMSS and Embedded Systems—XMSS Hardware Accelerators for RISC-V", IACR, International Association for Cryptologic Research, vol. 20181230: 125359, Dec. 21, 2018 (Dec. 21, 2018), pp. 1-23, XP061027415.

Aysu Aydin et al: "Precomputation Methods for Hash-Based Signatures on Energy-Harvesting Platforms", IEEE Transactions On Computers, IEEE, USA, vol. 65, No. 9, Sep. 1, 2016 (Sep. 1, 2016), pp. 2925-2931, XP011618562.

Santosh Ghosh et al: "Lightweight Post-Quantum-Secure Digital Signature Approach for IoT Motes", IACR, International Association for Cryptologic Research, vol. 20190213:033538, Feb. 7, 2019 (Feb. 7, 2019), pp. 1-23, XP061031800.

Daniel J. Bernstein & Tanja Lang, Post-quantum cryptography, Sep. 14, 2017, Nature, vol. 549, pp. 1-7 (Year: 2017).

Non-Final Application issued in U.S. Appl. No. 16/455,908, dated May 27, 2021, 9 pages.

Notice of Allowance for U.S. Appl. No. 16/455,908, dated Sep. 8, 2021, 10 pages.

* cited by examiner

One-Time Hash-Based Signatures

A private key must only sign a single message

Multi-Time Hash-Based Signatures

A private key can sign a multiple messages

FAST XMSS SIGNATURE VERIFICATION AND NONCE SAMPLING PROCESS WITHOUT SIGNATURE EXPANSION

BACKGROUND

Subject matter described herein relates generally to the field of computer security and more particularly to parallel processing techniques for hash-based signature algorithms.

Existing public-key digital signature algorithms such as Rivest-Shamir-Adleman (RSA) and Elliptic Curve Digital Signature Algorithm (ECDSA) are anticipated not to be secure against brute-force attacks based on algorithms such as Shor's algorithm using quantum computers. As a result, there are efforts underway in the cryptography research community and in various standards bodies to define new standards for algorithms that are secure against quantum computers.

Accordingly, techniques to accelerate post-quantum signature schemes such may find utility, e.g., in computer-based communication systems and methods.

BRIEF DESCRIPTION OF THE DRAWINGS

The detailed description is described with reference to the accompanying figures.

DETAILED DESCRIPTION

Figure 1A:
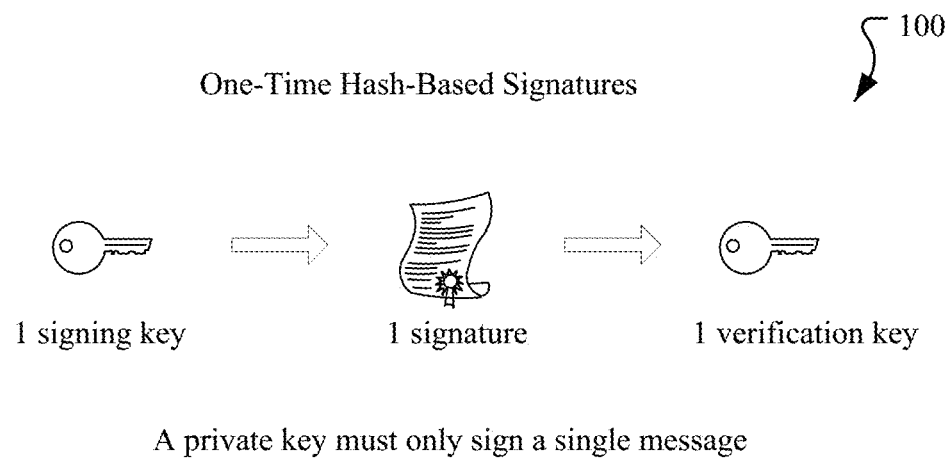
FIGS. 1A and 1B are schematic illustrations of a one-time hash-based signatures scheme and a multi-time hash-based signatures scheme, respectively.

Described herein are exemplary systems and methods to implement accelerators for post-quantum cryptography secure hash-based signature algorithms. In the following description, numerous specific details are set forth to provide a thorough understanding of various examples. However, it will be understood by those skilled in the art that the various examples may be practiced without the specific details. In other instances, well-known methods, procedures, components, and circuits have not been illustrated or described in detail so as not to obscure the examples.

As described briefly above, existing public-key digital signature algorithms such as Rivest-Shamir-Adleman (RSA) and Elliptic Curve Digital Signature Algorithm (ECDSA) are anticipated not to be secure against brute-force attacks based on algorithms such as Shor's algorithm using quantum computers. The eXtended Merkle signature scheme (XMSS) and/or an eXtended Merkle many time signature scheme (XMSS-MT) are hash-based signature schemes that can protect against attacks by quantum computers. As used herein, the term XMSS shall refer to both the XMSS scheme and the XMSS-MT scheme.

An XMSS signature process implements a hash-based signature scheme using a one-time signature scheme such as a Winternitz one-time signature (WOTS) or a derivative there of (e.g., WOTS+) in combination with a secure hash algorithm (SHA) such as SHA2-256 as the primary underlying hash function. In some examples the XMSS signature/verification scheme may also use one or more of SHA2-512, SHA3-SHAKE-256 or SHA3-SHAKE-512 as secure hash functions. XMSS-specific hash functions include a Pseudo-Random Function (PRF), a chain hash (F), a tree hash (H) and message hash function ($H_{msg}$). As used herein, the term WOTS shall refer to the WOTS signature scheme and or a derivative scheme such as WOTS+.

The Leighton/Micali signature (LMS) scheme is another hash-based signature scheme that uses Leighton/Micali one-time signatures (LM-OTS) as the one-time signature building block. LMS signatures are based on a SHA2-256 hash function.

An XMSS signature process comprises three major operations. The first major operation receives an input message (M) and a private key (sk) and utilizes a one-time signature algorithm (e.g., WOTS+) to generate a message representative (M') that encodes a public key (pk). In a 128-bit post quantum security implementation the input message M is subjected to a hash function and then divided into 67 message components (n bytes each), each of which are subjected to a hash chain function to generate the a corresponding 67 components of the digital signature. Each chain function invokes a series of underlying secure hash algorithms (SHA).

The second major operation is an L-Tree computation, which combines WOTS+ (or WOTS) public key components (n-bytes each) and produces a single n-byte value. For example, in the 128-bit post-quantum security there are 67 public key components, each of which invokes an underlying secure hash algorithm (SHA) that is performed on an input block.

The third major operation is a tree-hash operation, which constructs a Merkle tree. In an XMSS verification, an authentication path that is provided as part of the signature and the output of L-tree operation is processed by a tree-hash operation to generate the root node of the Merkle tree, which should correspond to the XMSS public key. For XMSS verification with 128-bit post-quantum security, traversing the Merkle tree comprises executing secure hash operations. In an XMSS verification, the output of the Tree-hash operation is compared with the known public key. If they match then the signature is accepted. By contrast, if they do not match then the signature is rejected.

The XMSS signature process is computationally expensive. An XMSS signature process invokes hundreds, or even thousands, of cycles of hash computations. Subject matter described herein addresses these and other issues by providing systems and methods to implement accelerators for post-quantum cryptography secure XMSS and LMS hash-based signing and verification.

Post-Quantum Cryptography Overview

Post-Quantum Cryptography (also referred to as "quantum-proof", "quantum-safe", "quantum-resistant", or simply "PQC") takes a futuristic and realistic approach to cryptography. It prepares those responsible for cryptography as well as end-users to know the cryptography is outdated; rather, it needs to evolve to be able to successfully address the evolving computing devices into quantum computing and post-quantum computing.

It is well-understood that cryptography allows for protection of data that is communicated online between individuals and entities and stored using various networks. This communication of data can range from sending and receiving of emails, purchasing of goods or services online, accessing banking or other personal information using websites, etc.

Conventional cryptography and its typical factoring and calculating of difficult mathematical scenarios may not matter when dealing with quantum computing. These mathematical problems, such as discrete logarithm, integer factorization, and elliptic-curve discrete logarithm, etc., are not capable of withstanding an attack from a powerful quantum computer. Although any post-quantum cryptography could be built on the current cryptography, the novel approach would need to be intelligent, fast, and precise enough to resist and defeat any attacks by quantum computers Today's PQC is mostly focused on the following approaches: 1) hash-based cryptography based on Merkle's hash tree public-key signature system of 1979, which is built upon a one-message-signature idea of Lamport and Diffie; 2) code-based cryptography, such as McEliece's hidden-Goppa-code public-key encryption system; 3) lattice-based cryptography based on Hoffstein-Pipher-Silverman public-key-encryption system of 1998; 4) multivariate-quadratic equations cryptography based on Patarin's HFE public-key-signature system of 1996 that is further based on the Matumoto-Imai proposal; 5) supersingular elliptical curve isogeny cryptography that relies on supersingular elliptic curves and supersingular isogeny graphs; and 6) symmetric key quantum resistance.

Figure 1B:
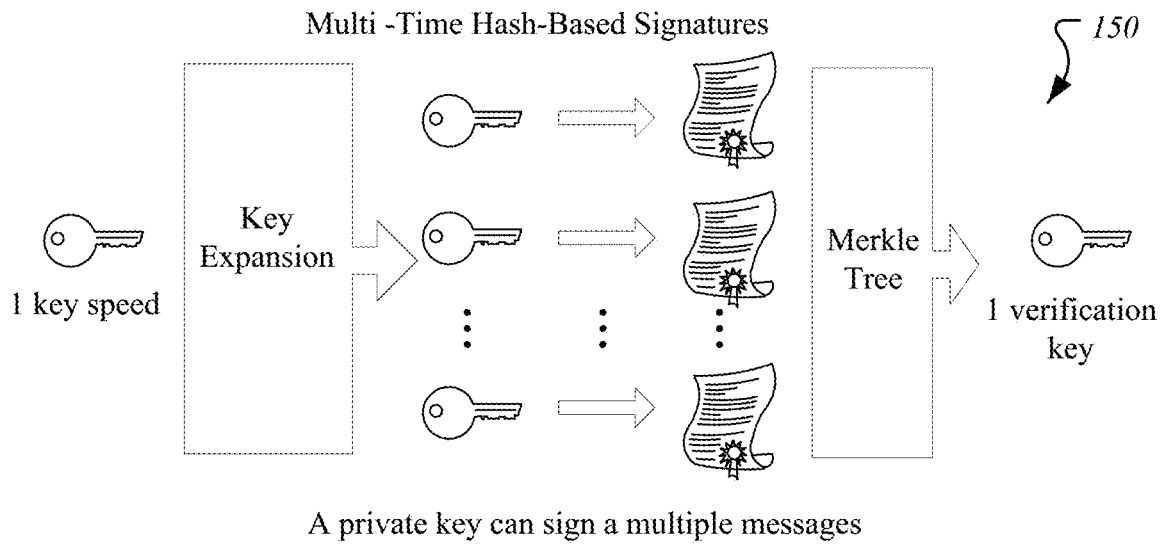

FIGS. 1A and 1B illustrate a one-time hash-based signatures scheme and a multi-time hash-based signatures scheme, respectively. As aforesaid, hash-based cryptography is based on cryptographic systems like Winternitz schemes, Lamport signatures, Merkle Signatures, extended Merkle signature scheme (XMSS), and SPHINCs scheme, etc. With the advent of quantum computing and in anticipation of its growth, there have been concerns about various challenges that quantum computing could pose and what could be done to counter such challenges using the area of cryptography.

One area that is being explored to counter quantum computing challenges is hash-based signatures (HBS) since these schemes have been around for a long while and possess the necessarily basic ingredients to counter the quantum counting and post-quantum computing challenges. HBS schemes are regarded as fast signature algorithms working with fast platform secured-boot, which is regarded as the most resistant to quantum and post-quantum computing attacks.

For example, as illustrated with respect to FIG. 1A, a scheme of HBS is shown that uses Merkle trees along with a one-time signature (OTS) scheme 100, such as using a private key to sign a message and a corresponding public key to verify the OTS message, where a private key only signs a single message.

Similarly, as illustrated with respect to FIG. 1B, another HBS scheme is shown, where this one relates to multi-time signatures (MTS) scheme 150, where a private key can sign multiple messages.

Figure 2A:
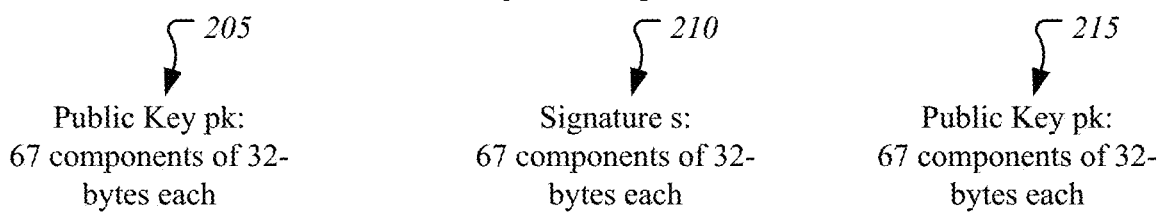
FIGS. 2A-2B are schematic illustrations of a one-time signature scheme and a multi-time signature scheme, respectively.
Figure 2A:
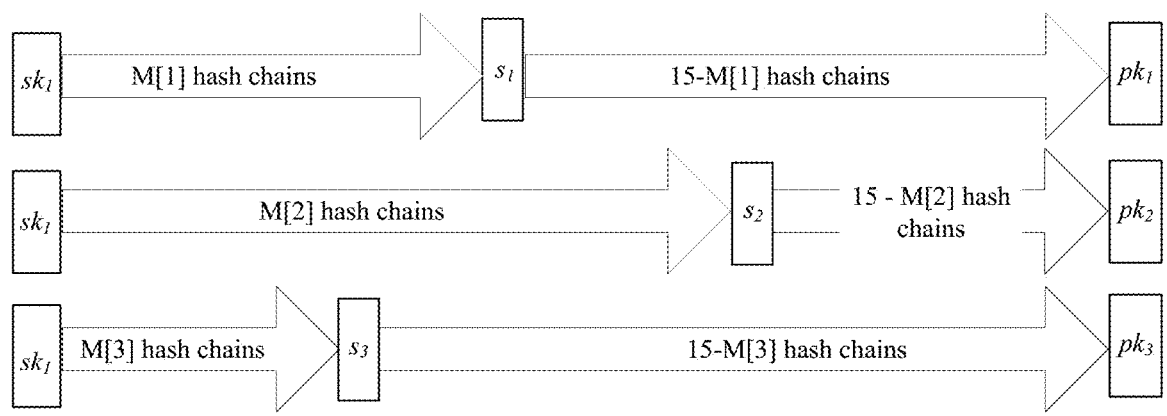
Figure 2A:
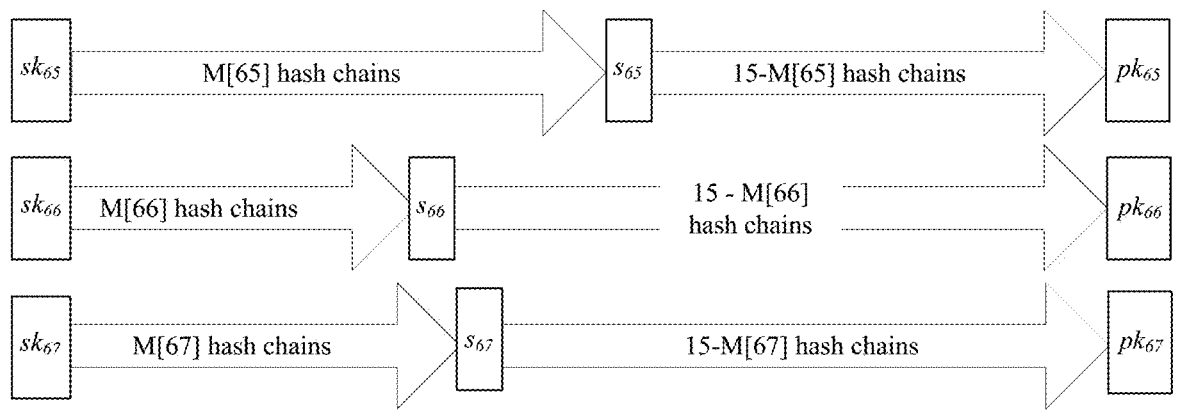
Figure 2B:
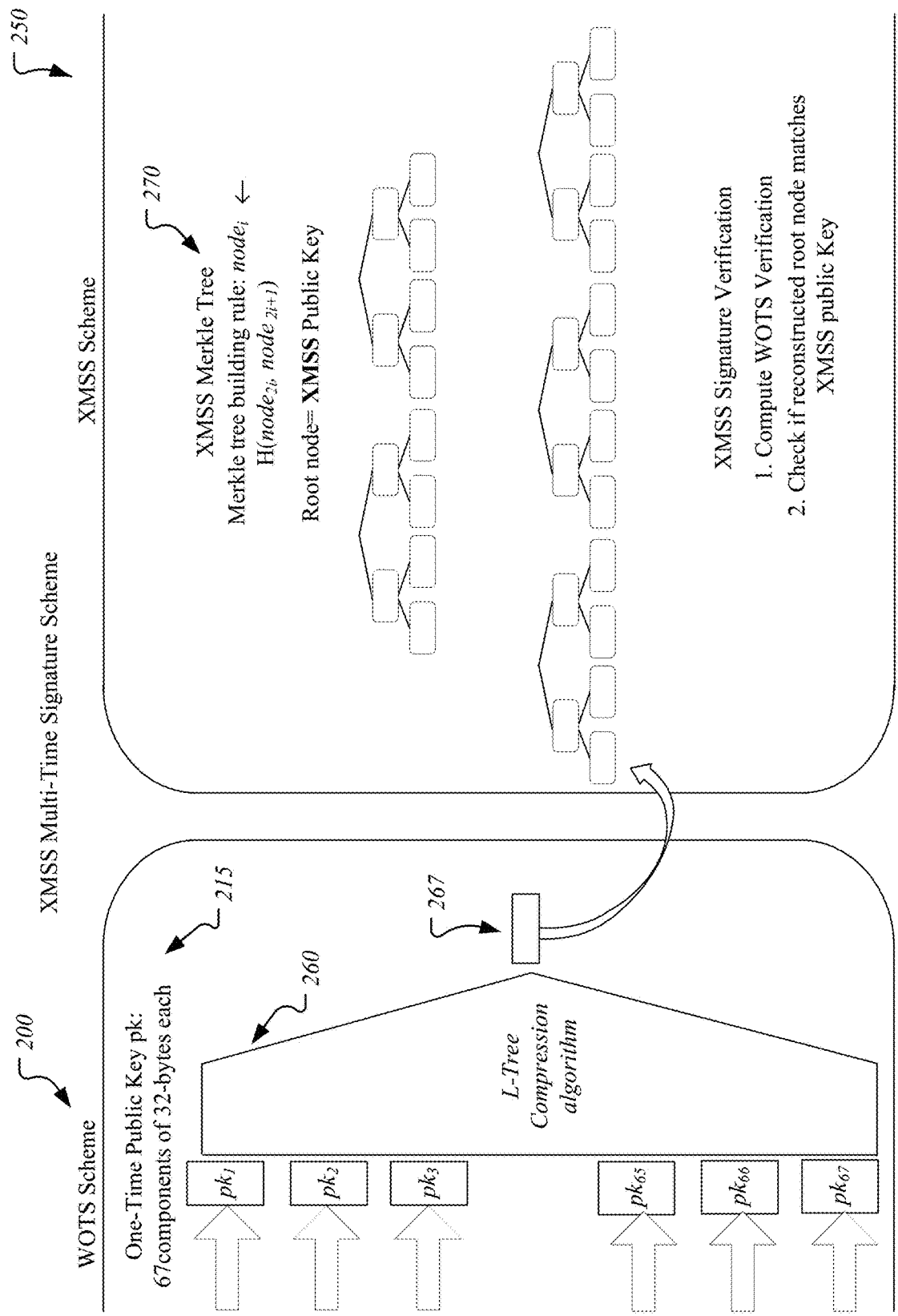

FIGS. 2A and 2B illustrate a one-time signature scheme and a multi-time signature scheme, respectively. Continuing with HBS-based OTS scheme 100 of FIG. 1A and MTS scheme 150 of FIG. 1B, FIG. 2A illustrates Winternitz OTS scheme 200, which was offered by Robert Winternitz of Stanford Mathematics Department publishing as hw(x) as opposed to h(x)|h(y), while FIG. 2B illustrates XMSS MTS scheme 250, respectively.

For example, WOTS scheme 200 of FIG. 2A provides for hashing and parsing of messages into M, with 67 integers between [0, 1, 2, . . . , 15], such as private key, sk, 205, signature, s, 210, and public key, pk, 215, with each having 67 components of 32 bytes each.

FIG. 2B illustrates XMSS MTS scheme 250 that allows for a combination of WOTS scheme 200 of FIG. 2A and XMSS scheme 255 having XMSS Merkle tree. As discussed previously with respect to FIG. 2A, WOTs scheme 200 is based on a one-time public key, pk, 215, having 67 components of 32 bytes each, that is then put through L-Tree compression algorithm 260 to offer WOTS compressed pk 265 to take a place in the XMSS Merkle tree of XMSS scheme 255. It is contemplated that XMSS signature verification may include computing WOTS verification and checking to determine whether a reconstructed root node matches the XMSS public key, such as root node=XMSS public key.

Accelerators for Post-Quantum Cryptography

Figure 3:
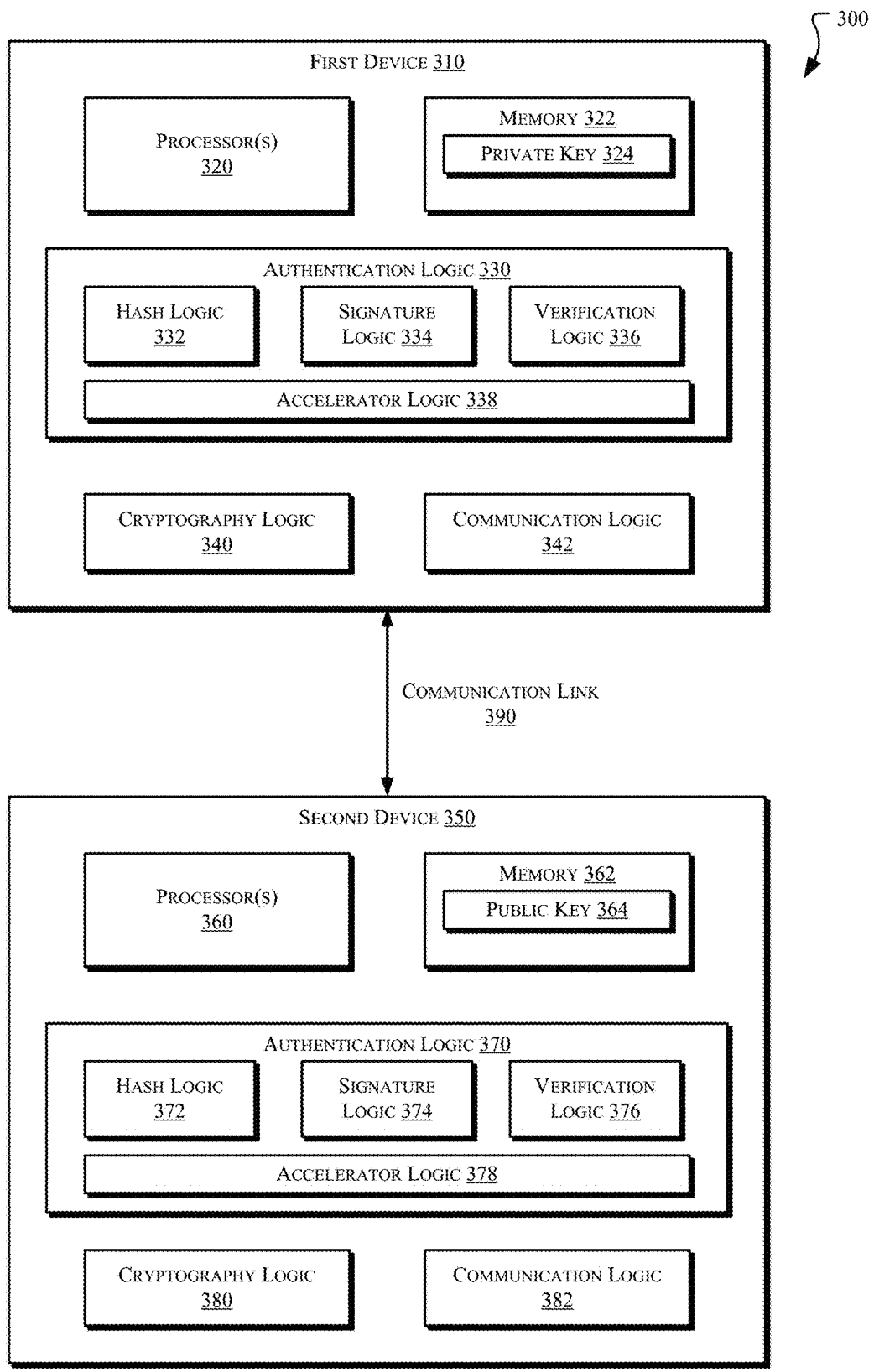
FIG. 3 is a schematic illustration of a signing device and a verifying device, in accordance with some examples.

FIG. 3 is a schematic illustration of a high-level architecture of a secure environment 300 that includes a first device 310 and a second device 350, in accordance with some examples. Referring to FIG. 3, each of the first device 310 and the second device 350 may be embodied as any type of computing device capable of performing the functions described herein. For example, in some embodiments, each of the first device 310 and the second device 350 may be embodied as a laptop computer, tablet computer, notebook, netbook, Ultrabook™, a smartphone, cellular phone, wearable computing device, personal digital assistant, mobile Internet device, desktop computer, router, server, workstation, and/or any other computing/communication device.

First device 310 includes one or more processor(s) 320 and a memory 322 to store a private key 324. The processor(s) 320 may be embodied as any type of processor capable of performing the functions described herein. For example, the processor(s) 320 may be embodied as a single or multi-core processor(s), digital signal processor, microcontroller, or other processor or processing/controlling circuit. Similarly, the memory 322 may be embodied as any type of volatile or non-volatile memory or data storage capable of performing the functions described herein. In operation, the memory 322 may store various data and software used during operation of the first device 310 such as operating systems, applications, programs, libraries, and drivers. The memory 322 is communicatively coupled to the processor(s) 320. In some examples the private key 324 may reside in a secure memory that may be part memory 322 or may be separate from memory 322.

First device 310 further comprises authentication logic 330 which includes hash logic 332, signature logic 334, and verification logic 336. Hash logic 332 is configured to hash (i.e., to apply a hash function to) a message (M) to generate a hash value (m') of the message M. Hash functions may include, but are not limited to, a secure hash function, e.g., secure hash algorithms SHA2-256 and/or SHA3-256, etc. SHA2-256 may comply and/or be compatible with Federal Information Processing Standards (FIPS) Publication 180-4, titled: "Secure Hash Standard (SHS)", published by National Institute of Standards and Technology (NIST) in March 2012, and/or later and/or related versions of this standard. SHA3-256 may comply and/or be compatible with FIPS Publication 202, titled: "SHA-3 Standard: Permutation-Based Hash and Extendable-Output Functions", published by NIST in August 2015, and/or later and/or related versions of this standard.

Signature logic 334 may be configured to generate a signature to be transmitted, i.e., a transmitted signature. In instances in which the first device 310 is the signing device, the transmitted signature may include a number, L, of transmitted signature elements with each transmitted signature element corresponding to a respective message element. For example, for each message element, $m_i$, signature logic 334 may be configured to perform a selected signature operation on each private key element, $sk_i$ of the private key, sk, a respective number of times related to a value of each message element, $m_i$ included in the message representative m'. For example, signature logic 334 may be configured to apply a selected hash function to a corresponding private key element, $sk_i$, $m_i$ times. In another example, signature logic 334 may be configured to apply a selected chain function (that contains a hash function) to a corresponding private key element, $sk_i$, $m_i$ times. The selected signature operations may, thus, correspond to a selected hash-based signature scheme.

As described above, hash-based signature schemes may include, but are not limited to, a Winternitz (W) one time signature (OTS) scheme, an enhanced Winternitz OTS scheme (e.g., WOTS+), a Merkle many time signature scheme, an extended Merkle signature scheme (XMSS) and/or an extended Merkle multiple tree signature scheme (XMSS-MT), etc. Hash functions may include, but are not limited to SHA2-256 and/or SHA3-256, etc. For example, XMSS and/or XMSS-MT may comply or be compatible with one or more Internet Engineering Task Force (IETF®) informational draft Internet notes, e.g., "XMSS: Extended Hash-Based Signatures, released May, 2018, by the Internet Research Task Force (IRTF), Crypto Forum Research Group.

A WOTS signature algorithm may be used to generate a signature and to verify a received signature utilizing a hash function. WOTS is further configured to use the private key and, thus, each private key element, $sk_i$, one time. For example, WOTS may be configured to apply a hash function to each private key element, $m_i$ or N-$m_i$ times to generate a signature and to apply the hash function to each received message element N-$m_i'$ or $m_i'$ times to generate a corresponding verification signature element. The Merkle many time signature scheme is a hash-based signature scheme that utilizes an OTS and may use a public key more than one time. For example, the Merkle signature scheme may utilize Winternitz OTS as the one-time signature scheme. WOTS+ is configured to utilize a family of hash functions and a chain function.

XMSS, WOTS+ and XMSS-MT are examples of hash-based signature schemes that utilize chain functions. Each chain function is configured to encapsulate a number of calls to a hash function and may further perform additional operations. In some examples, the number of calls to the hash function included in the chain function may be fixed. Chain functions may improve security of an associated hash-based signature scheme.

Cryptography logic 340 is configured to perform various cryptographic and/or security functions on behalf of the first device 310. In some embodiments, the cryptography logic 340 may be embodied as a cryptographic engine, an independent security co-processor of the first device 310, a cryptographic accelerator incorporated into the processor(s) 320, or a standalone software/firmware. In some embodiments, the cryptography logic 340 may generate and/or utilize various cryptographic keys (e.g., symmetric/asymmetric cryptographic keys) to facilitate encryption, decryption, signing, and/or signature verification. Additionally, in some embodiments, the cryptography logic 340 may facilitate to establish a secure connection with remote devices over communication link. It should further be appreciated that, in some embodiments, the cryptography module 340 and/or another module of the first device 310 may establish a trusted execution environment or secure enclave within which a portion of the data described herein may be stored and/or a number of the functions described herein may be performed.

After the signature is generated as described above, the message, M, and signature may then be sent by first device 310, e.g., via communication logic 342, to second device 350 via network communication link 390. In an embodiment, the message, M, may not be encrypted prior to transmission. In another embodiment, the message, M, may be encrypted prior to transmission. For example, the message, M, may be encrypted by cryptography logic 340 to produce an encrypted message.

Second device 350 may also include one or more processors 360 and a memory 362 to store a public key 364. As described above, the processor(s) 360 may be embodied as any type of processor capable of performing the functions described herein. For example, the processor(s) 360 may be embodied as a single or multi-core processor(s), digital signal processor, microcontroller, or other processor or processing/controlling circuit. Similarly, the memory 362 may be embodied as any type of volatile or non-volatile memory or data storage capable of performing the functions described herein. In operation, the memory 362 may store various data and software used during operation of the second device 350 such as operating systems, applications, programs, libraries, and drivers. The memory 362 is communicatively coupled to the processor(s) 360.

In some examples the public key 364 may be provided to second device 350 in a previous exchange. The public key, pk, is configured to contain a number L of public key elements, i.e., pk=[pk1, . . . , pkL]. The public key 364 may be stored, for example, to memory 362.

Second device 350 further comprises authentication logic 370 which includes hash logic 372, signature logic, and verification logic 376, a cryptographic logic 380, and a communication logic 382. As described above, hash logic 372 is configured to hash (i.e., to apply a hash function to) a message (M) to generate a hash message (m'). Hash functions may include, but are not limited to, a secure hash function, e.g., secure hash algorithms SHA2-256 and/or SHA3-256, etc. SHA2-256 may comply and/or be compatible with Federal Information Processing Standards (FIPS) Publication 180-4, titled: "Secure Hash Standard (SHS)", published by National Institute of Standards and Technology (NIST) in March 2012, and/or later and/or related versions of this standard. SHA3-256 may comply and/or be compatible with FIPS Publication 202, titled: "SHA-3 Standard: Permutation-Based Hash and Extendable-Output Functions", published by NIST in August 2015, and/or later and/or related versions of this standard.

In instances in which the second device is the verifying device, authentication logic 370 is configured to generate a verification signature based, at least in part, on the signature received from the first device and based, at least in part, on the received message representative (m'). For example, authentication logic 370 may configured to perform the same signature operations, i.e., apply the same hash function or chain function as applied by hash logic 332 of authentication logic 330, to each received message element a number, N-mi' (or mi'), times to yield a verification message element. Whether a verification signature, i.e., each of the L verification message elements, corresponds to a corresponding public key element, pki, may then be determined. For example, verification logic 370 may be configured to compare each verification message element to the corresponding public key element, pki. If each of the verification message element matches the corresponding public key element, pki, then the verification corresponds to success. In other words, if all of the verification message elements match the public key elements, pk1, . . . , pkL, then the verification corresponds to success. If any verification message element does not match the corresponding public key element, pki, then the verification corresponds to failure.

As described in greater detail below, in some examples the authentication logic 330 of the first device 310 includes one or more accelerators 338 that cooperate with the hash logic 332, signature logic 334 and/or verification logic 336 to accelerate authentication operations. Similarly, in some examples the authentication logic 370 of the second device 350 includes one or more accelerators 378 that cooperate with the hash logic 372, signature logic 374 and/or verification logic 376 to accelerate authentication operations. Examples of accelerators are described in the following paragraphs and with reference to the accompanying drawings.

The various modules of the environment 300 may be embodied as hardware, software, firmware, or a combination thereof. For example, the various modules, logic, and other components of the environment 300 may form a portion of, or otherwise be established by, the processor(s) 320 of first device 310 or processor(s) 360 of second device 350, or other hardware components of the devices As such, in some embodiments, one or more of the modules of the environment 300 may be embodied as circuitry or collection of electrical devices (e.g., an authentication circuitry, a cryptography circuitry, a communication circuitry, a signature circuitry, and/or a verification circuitry). Additionally, in some embodiments, one or more of the illustrative modules may form a portion of another module and/or one or more of the illustrative modules may be independent of one another.

Figure 4A:
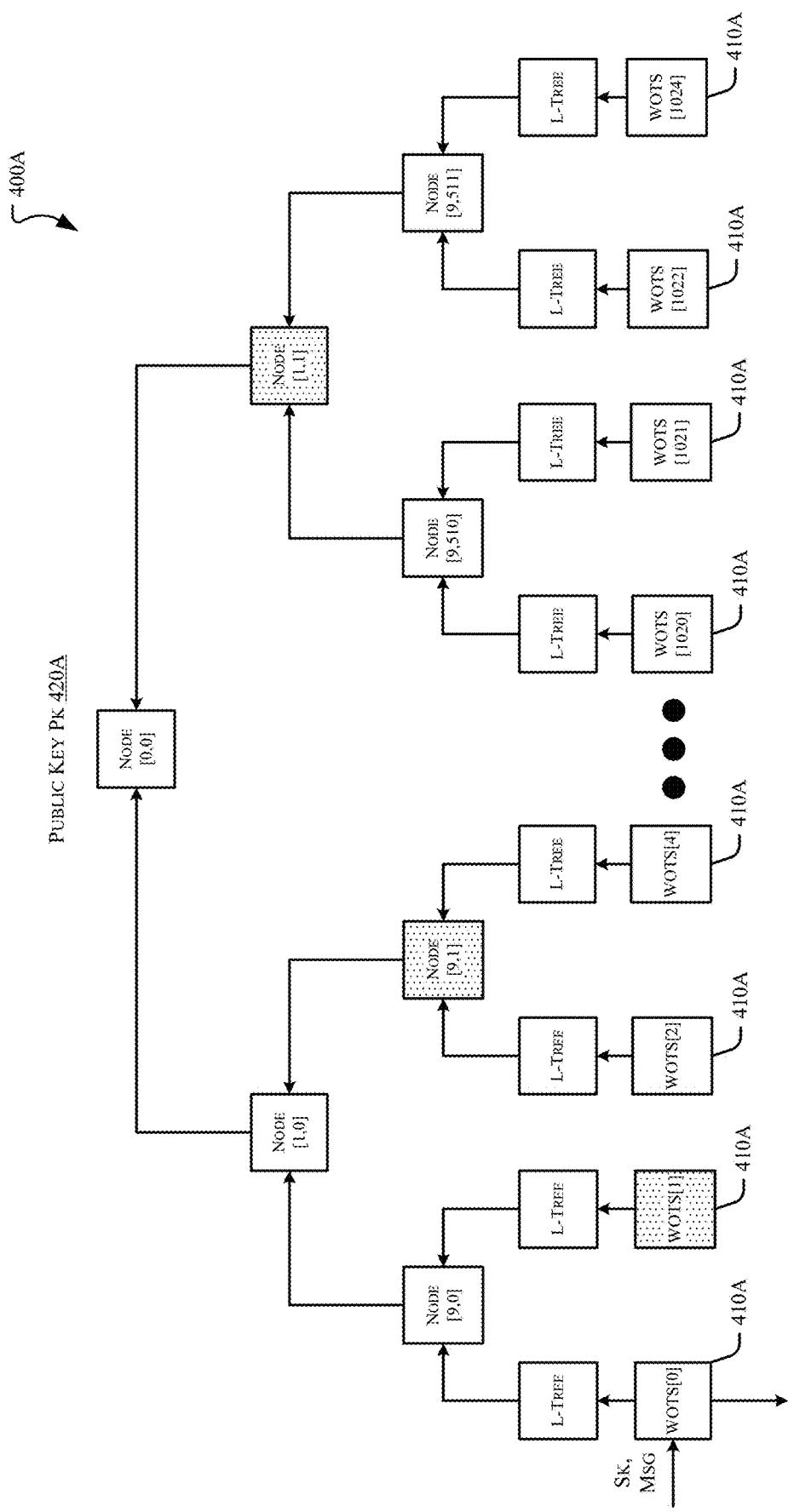
FIG. 4A is a schematic illustration of a Merkle tree structure, in accordance with some examples.

FIG. 4A is a schematic illustration of a Merkle tree structure illustrating signing operations, in accordance with some examples. Referring to FIG. 4A, an XMSS signing operation requires the construction of a Merkle tree 400A using the local public key from each leaf WOTS node 410A to generate a global public key (PK) 420. In some examples the authentication path and the root node value can be computed off-line such that these operations do not limit performance. Each WOTS node 410A has a unique secret key, "sk" which is used to sign a message only once. The XMSS signature consists of a signature generated for the input message and an authentication path of intermediate tree nodes to construct the root of the Merkle tree.

Figure 4B:
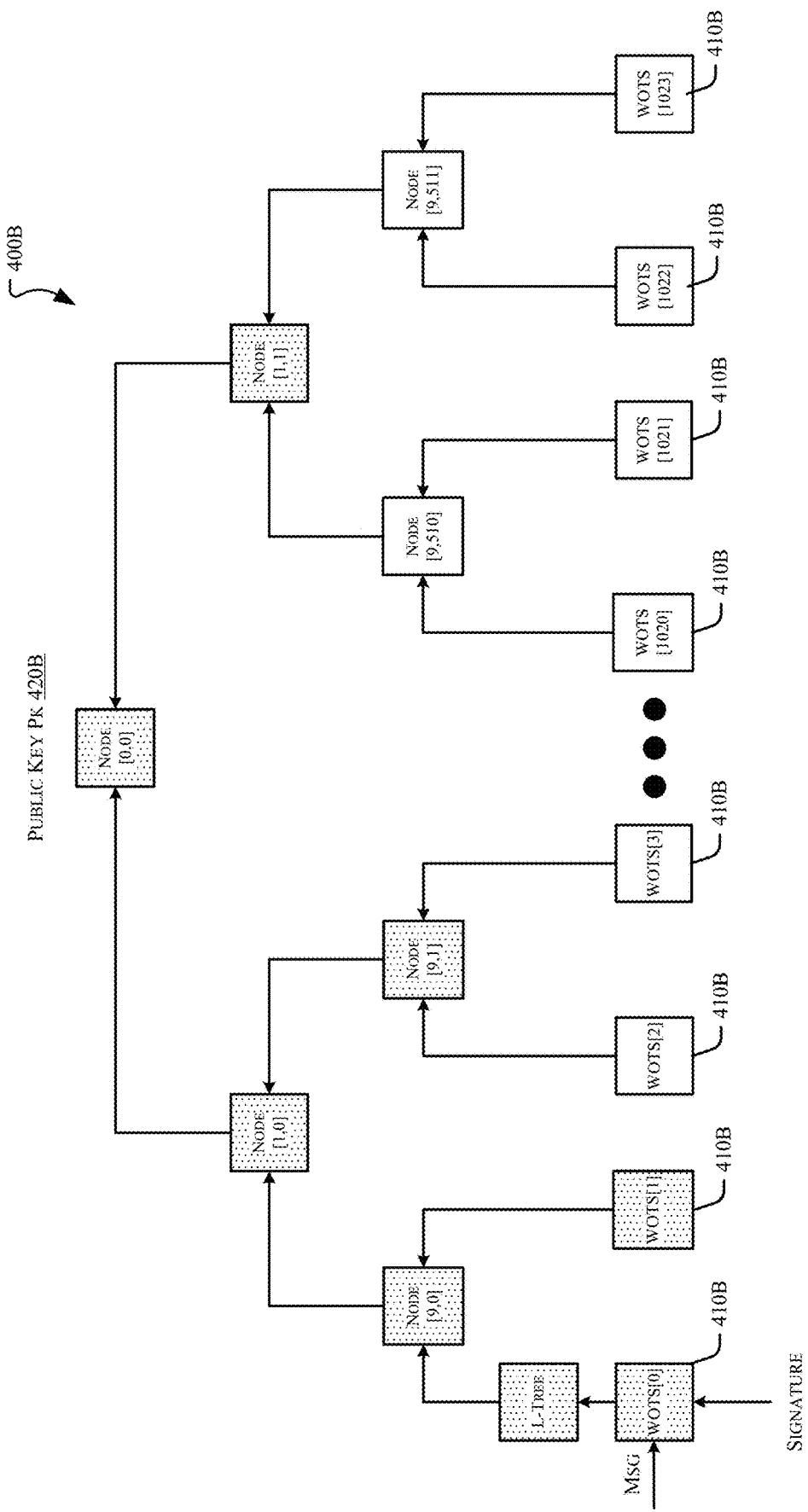
FIG. 4B is a schematic illustration of a Merkle tree structure, in accordance with some examples.

FIG. 4B is a schematic illustration of a Merkle tree structure 400B during verification, in accordance with some examples. During verification, the input message and signature are used to compute the local public key 410B of the WOTS node, which is further used to compute the tree root value using the authentication path. A successful verification will match the computed tree root value to the public key PK shared by the signing entity. The WOTS and L-Tree operations constitute a significant portion of XMSS sign/verify latency respectively, thus defining the overall performance of the authentication system. Described herein are various pre-computation techniques which may be implemented to speed-up WOTS and L-Tree operations, thereby improving XMSS performance. The techniques are applicable to the other hash options and scale well for both software and hardware implementations.

Figure 5:
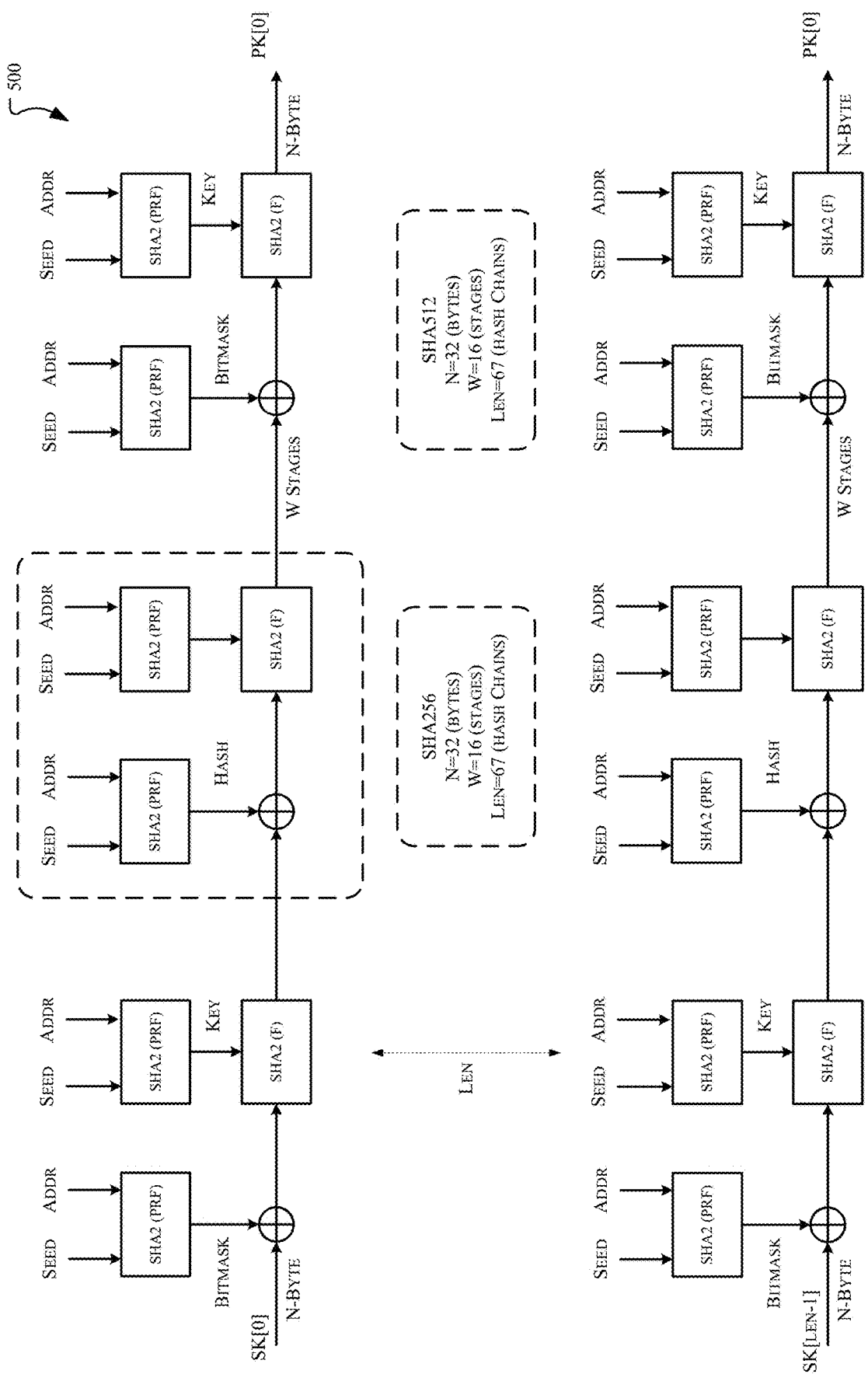
FIG. 5 is a schematic illustration of a compute blocks in an architecture to implement a signature algorithm, in accordance with some examples.

FIG. 5 is a schematic illustration of a compute blocks in an architecture 500 to implement a signature algorithm, in accordance with some examples. Referring to FIG. 5, the WOTS+ operation involves 67 parallel chains of 16 SHA2-256 HASH functions, each with the secret key sk[66:0] as input. Each HASH operation in the chain consists of 2 pseudo-random functions (PRF) using SHA2-256 to generate a bitmask and a key. The bitmask is XOR-ed with the previous hash and concatenated with the key as input message to a 3rd SHA2-256 hash operation. The 67×32-byte WOTS public key pk[66:0] is generated by hashing secret key sk across the 67 hash chains.

Figure 6A:
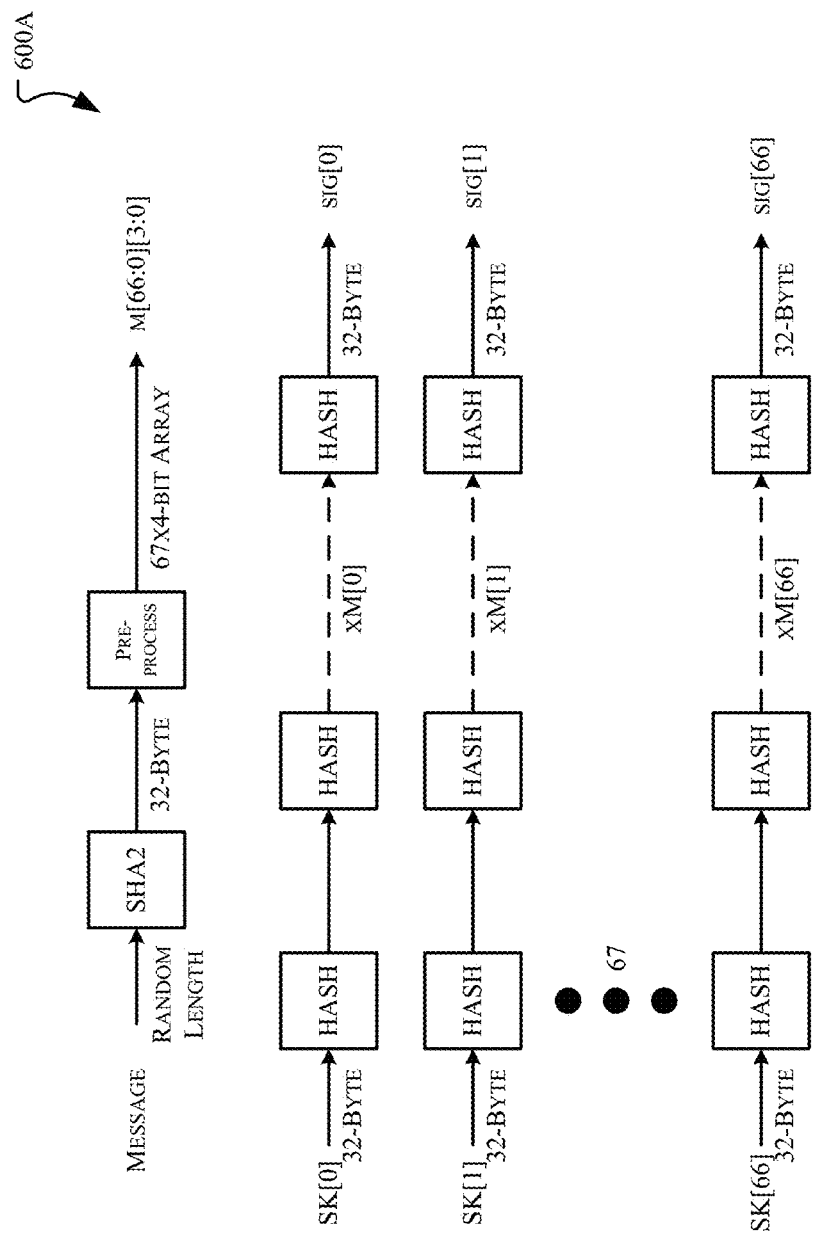
FIG. 6A is a schematic illustration of a compute blocks in an architecture to implement signature generation in a signature algorithm, in accordance with some examples.

FIG. 6A is a schematic illustration of a compute blocks in an architecture 600A to implement signature generation in a signature algorithm, in accordance with some examples. As illustrated in FIG. 6A, for message signing, the input message is hashed and pre-processed to compute a 67×4-bit value, which is used as an index to choose an intermediate hash value in each operation of the chain function.

Figure 6B:
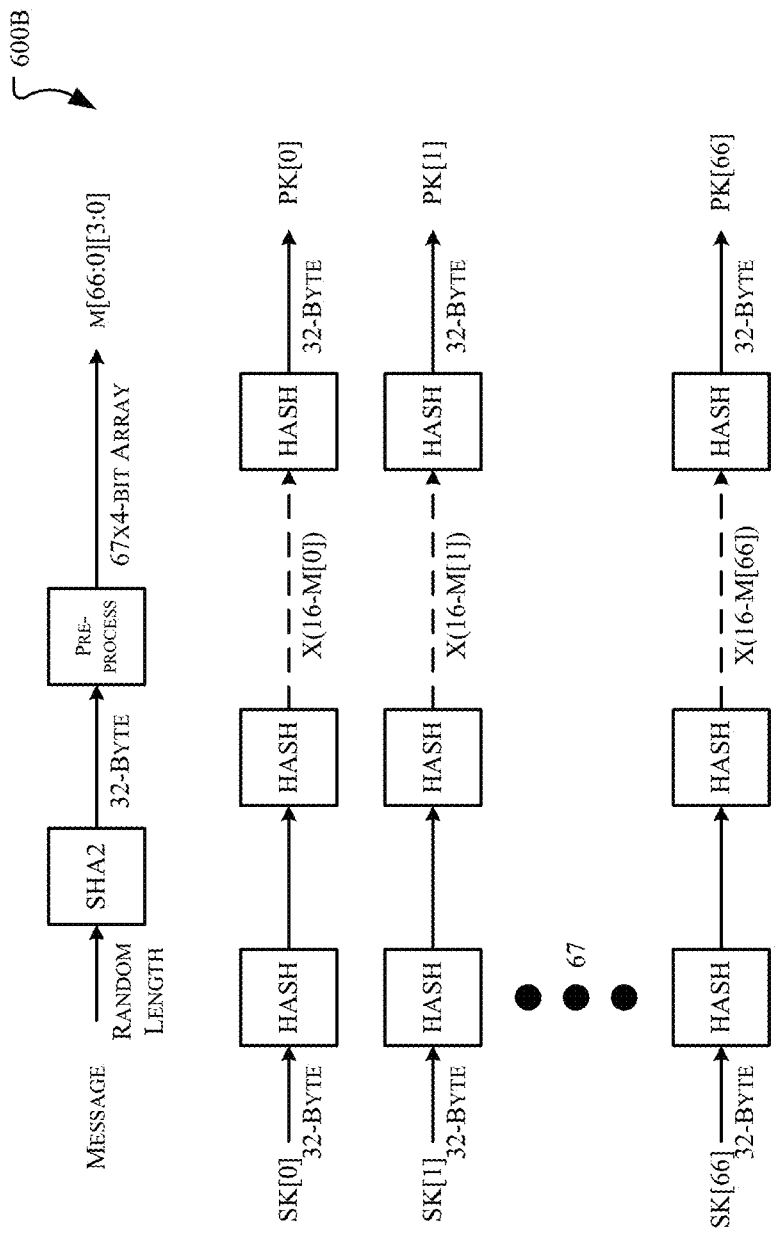
FIG. 6B is a schematic illustration of a compute blocks in an architecture to implement signature verification in a verification algorithm, in accordance with some examples.

FIG. 6B is a schematic illustration of a compute blocks in an architecture 600B to implement signature verification in a verification algorithm, in accordance with some examples. Referring to FIG. 6B, during verification, the message is again hashed to compute the signature indices and compute the remaining HASH operations in each chain to compute the WOTS public key pk. This value and the authentication path are used to compute the root of the Merkle tree and compare with the shared public key PK to verify the message.

Fast XMSS Signature Verification

Various electronic devices use cryptography algorithms (e.g., RSA and EC-DSA) to verify authenticity of their firmware at boot time. As described above, these cryptography algorithms are expected to be broken by quantum computers. The XMSS algorithm is one quantum resistant cryptography standard. The cost of XMSS signing and verification can vary significantly as these operations depend on a message representative, which is the result of hashing the message with one or more inputs.

The cost of XMSS signature verification is a function of the message representative, which is computed as the hash of the message to be signed concatenated with some other inputs. In the original XMSS scheme, message representative generation process is performed deterministically. Attempts have been made to randomize this process by introducing a random value in the message representative generation. For example, a large number of random values may be tested until one that produces a satisfactory message representative in terms of XMSS signature verification cost is found. These schemes suffer from certain disadvantages: the signer needs to transmit the random value in addition to the signature, the random value sampling process requires hashing the entire input for each new nonce attempt, and it is not compliant with how XMSS signing and verification are proposed in RFC-8391, for example.

Described herein are techniques to accelerate XMSS signature verification that accelerates XMSS signature verification, reduces the signing overhead for nonce sampling and it preserves the signature size. Techniques described herein can be applied to any configuration of the XMSS scheme, including any underlying hash function. These techniques also accelerate the nonce sampling process by pre-computing intermediate rounds of the SHA256 hash function. This feature is applicable to any SHA256-based XMSS configurations.

Accelerating XMSS signature verification may find utility, e.g., in deploying secure boot solutions based on XMSS signatures. Faster signature verification naturally leads to faster secure boot operations. Accelerating the nonce sampling process is important to reduce the cost of XMSS signature generation, facilitating deployment of XMSS in electronic device infrastructure.

As described above, the XMSS signature algorithm is a hash-based signature scheme that uses the WOTS one-time signature algorithm as a building-block. The most computationally expensive step in XMSS signature verification is the WOTS signature verification. The WOTS algorithm utilizes a private key composed by L=67 chunks of 32 bytes each. The WOTS public key is generated by applying the WOTS hash chain exactly N=15 times over each of the L private key chunks. Each WOTS hash chain function leads to 3 calls to the SHA256 hash function. Thus the WOTS key generation cost is: 67×15×3=3,015 calls to SHA256, which represents a significant computational expense.

The WOTS signature generation consists of applying the WOTS hash chain function exactly M'[i] times for each one of the WOTS private key chunks (i∈[1 . . . L]). The buffer M' is a fixed-length message-representative of the message to be signed. The WOTS signature verification consists of applying the WOTS hash chain function exactly (N-M' [i]) times for each of the L signature chunks generated in the previous step. As expected, whenever the signature is authentic, the result of this process will match the WOTS public key.

Figure 7:
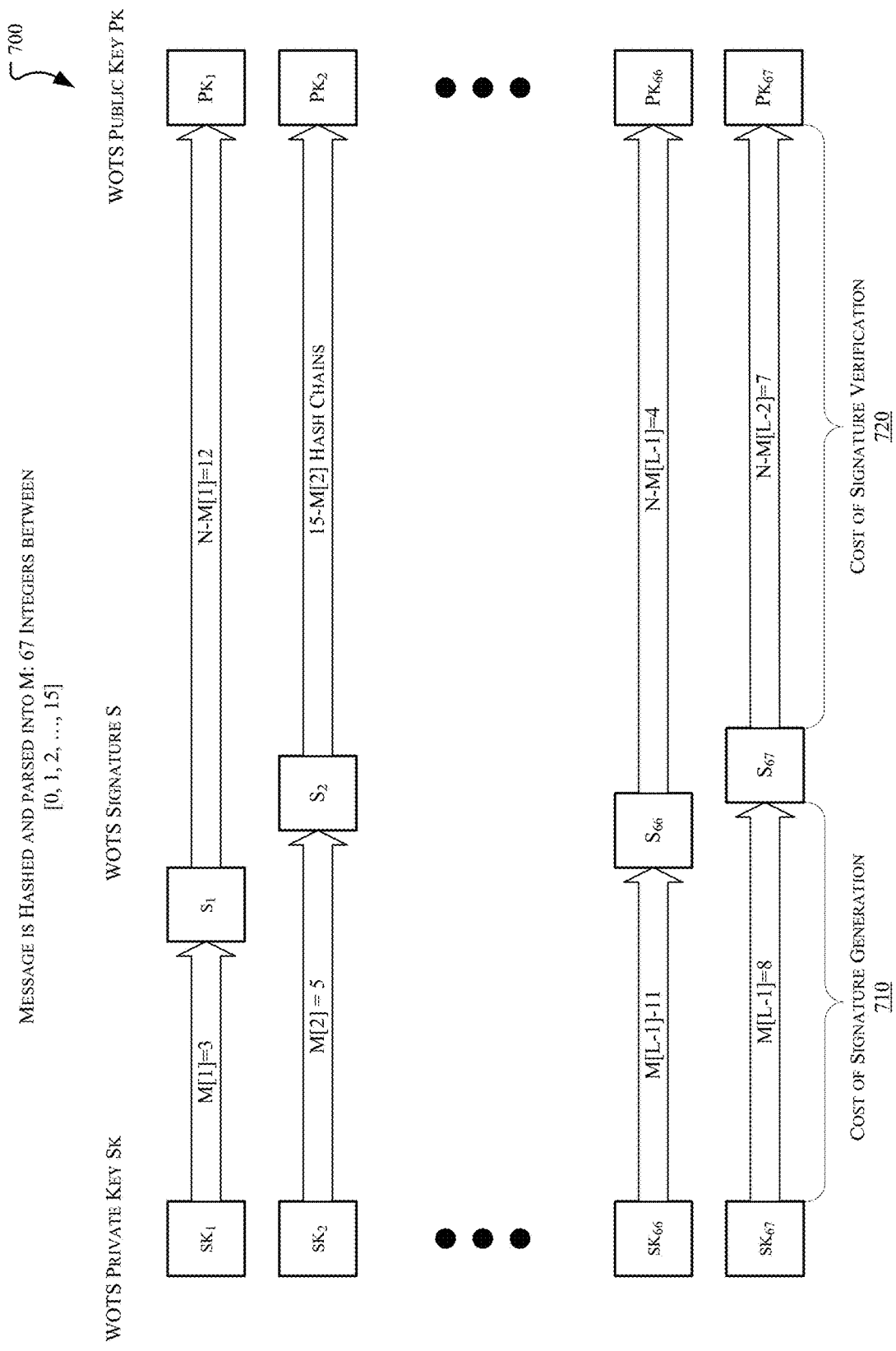
FIG. 7 is a schematic illustration of a WOTS signature and verification scheme, in accordance with some examples.

FIG. 7 is a schematic illustration of a WOTS signature and verification scheme 700, in accordance with some examples. Referring to FIG. 7, the total computational cost of signature generation plus signature verification yields the cost of key generation. Moreover, the value of the message representative chunks dictates how such cost is split between signing operations and verification operations. Certain message representatives may lead to a fast signing process at the cost of a more computationally expensive signature verification, while other message representatives may lead to a fast verification at the cost of a more computationally expensive signing operation.

Techniques described herein are designed to generate improved message-representatives that reduce XMSS signature verification cost without expanding the signature size, with minimal signing overhead and in a way that complies with RFC-8391 from a verifier's perspective. In some examples, the process of generating the message representative of any given message may be randomized. Existing techniques implement message representative M' of an arbitrary-length message M is produced in a 2-steps procedure described as indicated in Table 1.

TABLE 1A

RFC8391 Message Representative XMSS Procedure byte[n] r = PRF(getSK_PRF(SK), toByte(idx_sig, 32));
byte[n] M' = H_msg(r || getRoot(SK) || (toByte(idx_sig, n)), M);

In some examples this procedure may be simplified to solving the equation set in Table 1B.

TABLE 1B

Simplified Message Representative XMSS Procedure r ← SHA256(OPCODE3 || SK_PRF || idx_sig || PADDING32)
M' ← SHA256(OPECODE2 || r || ROOT || idx_sig || M || PADDING32)

In some examples the parameter 32 is a 32-byte buffer with a value 3 set in its least significant byte. OPCODE2 is a 32-bytes buffer with a value 2 set in its least significant byte. SK_PRF is a 32-bytes random buffer part of the private key. The parameter idx_sig is the 32-byte expanded version of the index of the signature. PADDING32 is a 32 byte padding buffer used by SHA256. ROOT is a 32-bytes buffer part of the public key. M is the 32-bytes message digest to be signed. The algorithm depicted in Table 1 is a deterministic algorithm.

Techniques described herein change the manner in which the parameter r is produced by introducing a random nonce of 8-bytes in the first 8 bytes of the padding buffer. This reduces the size of the padding to 24 bytes, given the additional 8 bytes provided by the nonce (32=8+24), without any harm to security. This process is repeated until a message-representative M' that leads to improved XMSS verification is found, as indicated in Table 2.

TABLE 2A

RFC 8391 Message Representative XMSS Procedure

While (true):
   byte[n] r = PRF(getSK_PRF(SK), toByte(idx_sig, 32));
   byte[n] M' = H_msg(r || getRoot(SK) || (toByte(idx_sig, n)), M);
   if (M' matches desirable pattern)
     Return (r, M')

In some examples this procedure may be simplified to solving the equation set in Table 2B.

TABLE 2B

Simplified Message Representative XMSS Procedure

While (true):
   r ← SHA256(OPCODE3 || SK_PRF || idx_sig || nonce || PADDING24)
   M' ← SHA256(OPCODE2 || r || ROOT || idx_sig || M || PADDING32)
   if (M' matches desirable pattern)
     Return (r, M')

Figure 8:
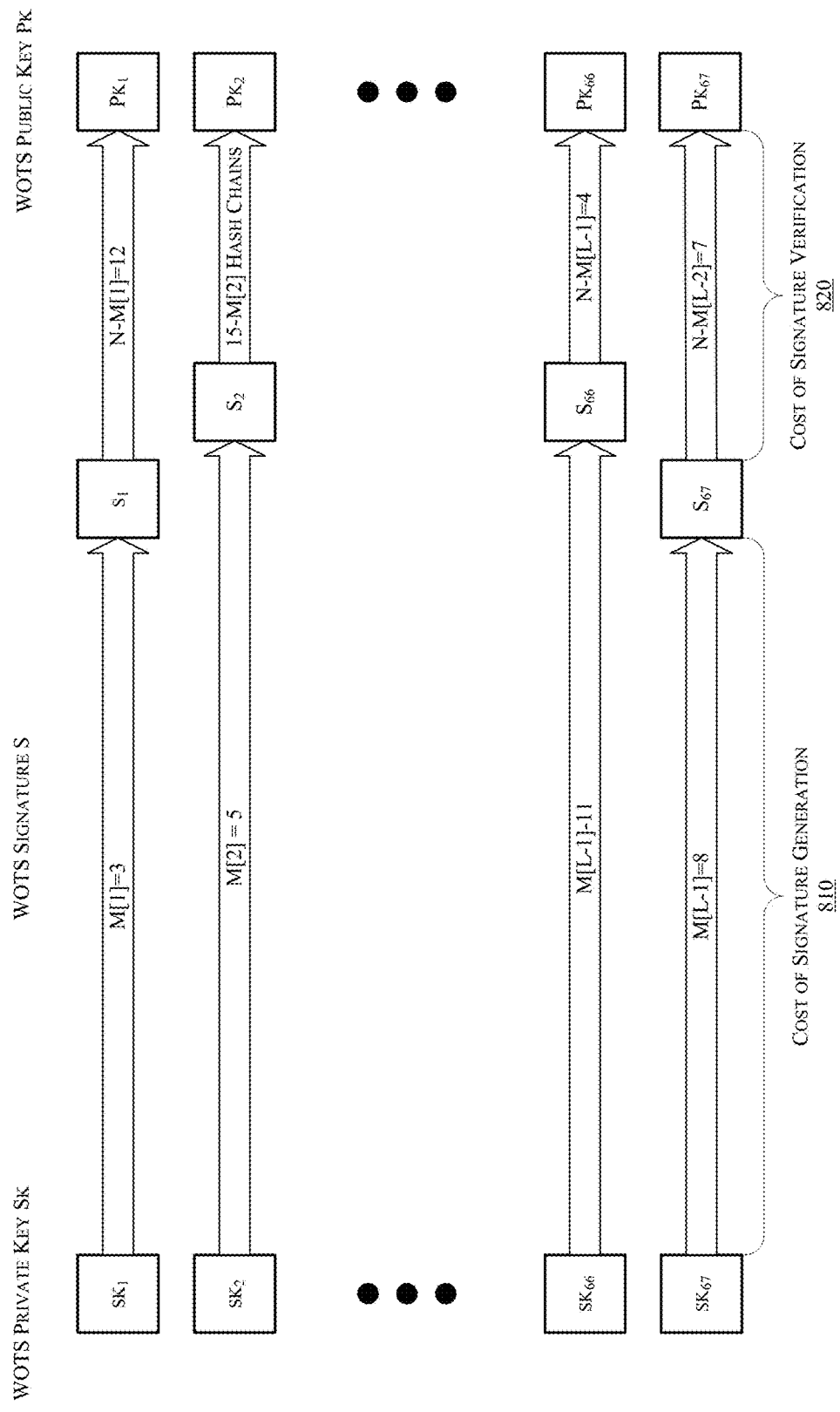
FIG. 8 is a schematic illustration of a WOTS signature and verification scheme, in accordance with some examples.

FIG. 8 is a schematic illustration of a WOTS signature and verification scheme 800, in accordance with some examples. As illustrated in FIG. 8, one benefit of message-representatives designed to improve WOTS verification is that the computational cost is concentrated in cost of the WOTS signature generation 810, which reduces the computational cost of the signature verification 820.

Figure 9:
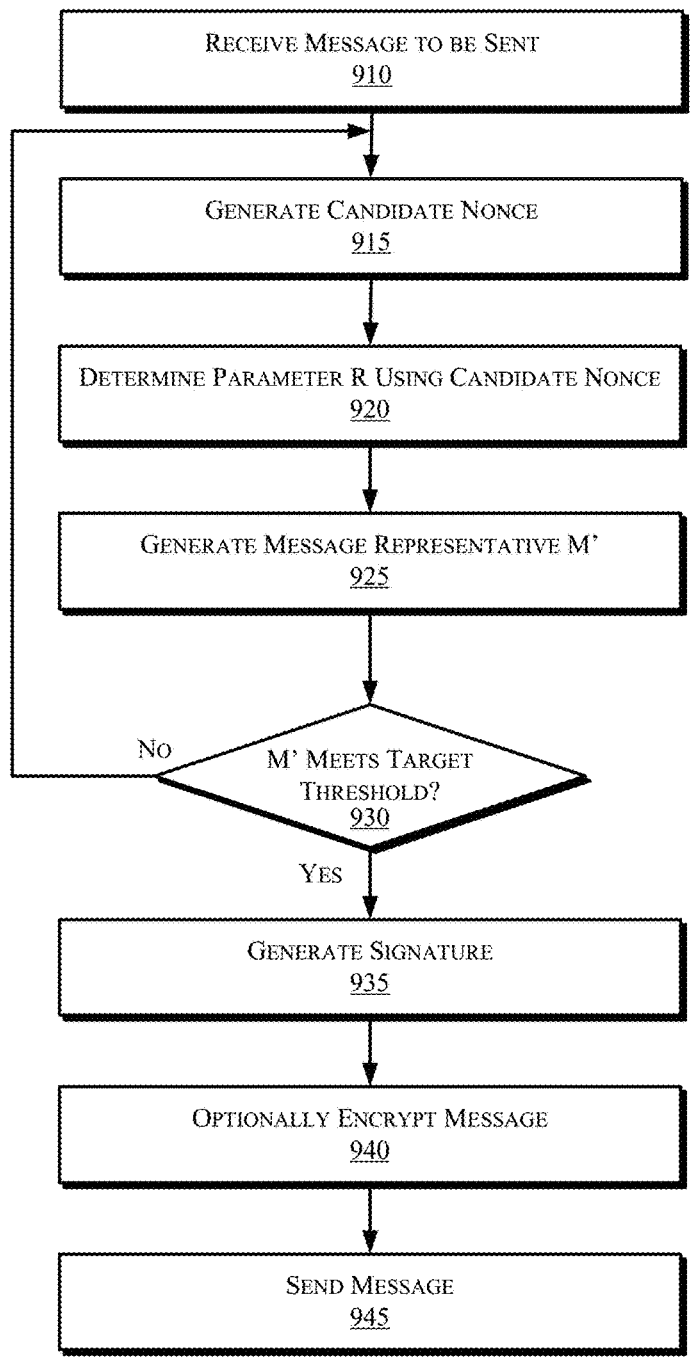
FIG. 9 is a flowchart illustrating operations in a method of a WOTS signature and verification scheme, in accordance with some examples.

FIG. 9 is a flowchart illustrating operations in a method of a WOTS signature and verification scheme, in accordance with some examples. In particular, the flowchart 900 illustrates identifying an appropriate nonce base, at least in part, on whether the message representative meets a target threshold. In some examples the operations depicted in FIG. 9 may be performed, for example, by accelerator logic 338, in combination with hash logic 332, signature logic 334 and verification logic 336 of authentication logic 330 of first device 310 depicted in FIG. 3.

Referring to FIG. 9, at operation 910 a message M to be sent from the first device 310 is received. At operation 915 a candidate nonce may be generated, and at operation 920 the parameter r is determined from the candidate nonce as describe above in Table 2. Similarly, at operation 925 the message representative M' is generated using the parameter r determined at operation 920, and as described above in Table 2.

At operation 930 it is determined whether the message representative satisfies a target threshold. If the message representative does not satisfy the target threshold, then program flow may return to operation 915 and a new candidate nonce may be generated. If the message representative satisfies the target threshold, then a transmitted signature may be generated at operation 935. For example, the candidate nonce may be selected and the transmitted signature generated based, at least in part, on the message representative determined based, at least in part, on the value of the parameter r determined from the selected nonce. In some embodiments, the message to be sent may be encrypted at operation 940. In some embodiments, the message to be sent may not be encrypted. The message or encrypted message may then be sent at operation 945.

Thus, one or more candidate values of the parameter r may be determined using random values until a corresponding message representative satisfies a target threshold. A hash-based signature scheme may then be applied to the message representative to generate a transmitted signature. The message and transmitted signature may then be transmitted to a verifier device.

The target threshold referenced in operation 930 may be configured to distribute computational costs associated with generating and verifying a hash-based signature between a signer device and a verifier device. The target threshold between the signer and the verifier may be represented by a threshold, T, where a corresponding target cost associated with the signer device is less than or equal to T(N−1)L or is greater than or equal to T(N−1)L. The corresponding target cost associated with the verifier device may then be greater than or equal to (1−T)(N−1)L or less than or equal to (1−T)(N−1). The threshold, T, may be selected based, at least in part, on balancing a respective number of hash-based signature operations, i.e., hash function operations and/or chain function operations, between a signer device and a verifier device and based, at least in part, on a latency associated with generating and identifying an appropriate nonce configured to achieve the threshold, T, for a given message, M. In some examples the target threshold T may be set to allocate a minimum of 60% of the computational cost to the signature generation process, such that a maximum of 40% of the computational cost is allocated to the signature verification process. In other examples the target threshold T may be set to allocate a minimum of 70% of the computational cost to the signature generation process, such that a maximum of 30% of the computational cost is allocated to the signature verification process.

Figure 10:
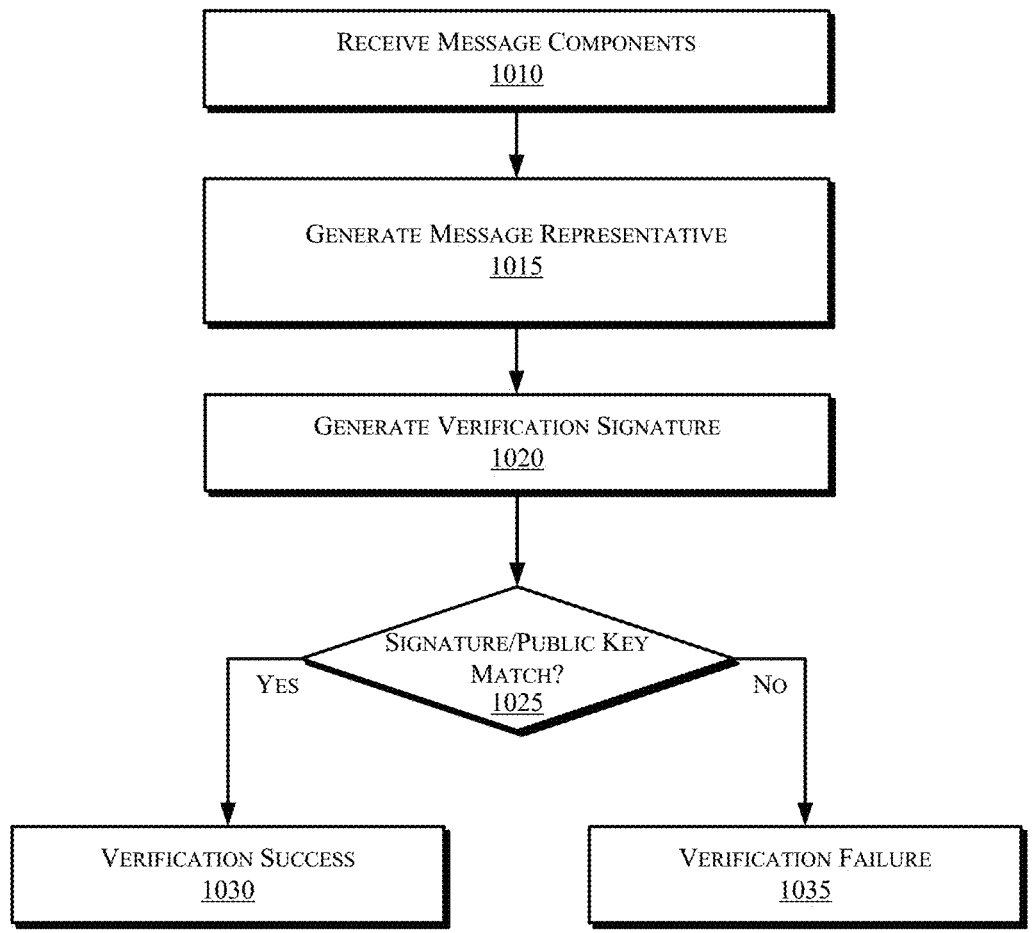
FIG. 10 is a flowchart illustrating operations in a method of a WOTS signature and verification scheme, in accordance with some examples.

FIG. 10 is a flowchart illustrating operations in a method of a WOTS signature and verification scheme, in accordance with some examples. In particular, the flowchart illustrates operations in an attempt to verify a received signature. In some examples the operations depicted in FIG. 10 may be performed, for example, by verification logic 376 of authentication logic 370 of second device 350 depicted in FIG. 3.

Referring to FIG. 10, at operation 1010 message components are received. At operation 1015, a message representative may be generated, and a verification signature may be generated at operation 1015. The verification signature may be generated based, at least in part, on the received signature and based, at least in part, on the received message representative. For example, the verification signature may be generated by applying a same hash function and/or chain function, as applied by, e.g., signer signature logic 336, to the received message representative, m', to generate the transmitted signature. For each element of the verification signature, the hash function or chain function may be applied a respective number of times determined by the corresponding element of the received message representative. At operation 1025 it is determined whether a verification signature corresponds to a public key. For example, each element of the verification signature may be compared to a corresponding element of the public key. If the verification signature corresponds to the public key, then program flow may continue at operation 1030. If the verification signature does not correspond to the public key, then a verification failure may be generated at operation 1035. Thus, whether a received signature corresponds to a transmitted signature may be verified.

Thus, an apparatus, method and/or system are configured to generate one or more message representatives based, at least in part, on a message, M, and based, at least in part, on a parameter r determined using one or more nonces. Each message representative, m', is related to the message, M. The apparatus, method and/or system are further configured to select the nonce that yields a corresponding message representative, m', that achieves a target balance between the cost of signature generation and the cost of signature verification.

The process of repeatedly sampling nonces to produce message representative candidates can be computationally expensive. Techniques described herein attempt to accelerate this nonce sampling process significantly. One skilled in the art will recognize that a faster nonce sampling process allows finding better nonces for the same computational cost. Intially, it is noted that that the first 96 bytes provided as input to the call r←SHA256 (OPCODE3∥SK_PRF∥idx_sig∥nonce∥PADDING24) are always the same for all nonces. Therefore, it is possible to pre-compute the internal state of SHA256 for the following input: (OPCODE3∥SK_PRF∥idx_sig). Once this internal state is pre-computed, the signer can continue the computation of SHA256 departing from this intermediate state to process (nonce∥PADDING24), for each new nonce. A similar pre-compute technique may be applied in the computation of M' because the first 32-bytes (OPCODE2) are always the same.

To understand performance gains obtained by techniques described herein, it is first useful to understand how a SHA256 hash function processes messages. As described above, SHA256 processes 64 bytes of input at a time. These 64 bytes of input are divided into 16 values of 32-bytes each, denoted as $W_1$, $W_2$, . . . , $W_{16}$. From these 16 values, SHA256 derives an additional 48 values of 32-bytes each, denoted as $W_{17}$, $W_{18}$, . . . , $W_{64}$. The SHA256 function has 64 founds and it uses one $W_i$ for each one of the rounds, $1 \leq i \leq 64$. This means that if the first 16 W's are known, it is possible to compute all 64 rounds. If less than the first 16 W's are known, say 15, then only 15 rounds can be pre-computed.

Regarding techniques for nonce-sampling for XMSS, while generating the value r, all 64 rounds of hashing (OPCODE3||SK_PRF) can be fully pre-computed. For the remaining input (idx_sig) of 32 bytes, the values $W_1$, $W_2, \ldots, W_8$ can be produced. This will save 8 additional rounds, resulting in a total savings of 64+8=72 rounds out of the 128 rounds expected to generate r from SHA256(OP-CODE||SK_PRF||idx_sig||nonce||PADDING24). While generating M', it is possible to save 8 rounds related to OPCODE2. In total, this technique requires 56 rounds for the computation of r plus 184 rounds for the computation of M', leading to 56+184=240 rounds, instead of the expected 128+192=320 rounds of a conventional technique. Thus this technique offers a significant speedup to generate the message representative M' when compared to existing techniques. Alternatively, instead of a speedup in this process, the technique can find better nonces than in the same amount of time.

Techniques described herein also improve signature size performance when compared to other XMSS signature and verification schemes. In some examples, the nonce does not need to be transmitted along with the XMSS signature. Using the parameter r, which is already part of the XMSS signature, it is possible to reconstruct M' during signature verification. This can increase the communication bandwidth by 8 bytes (or more, depending on the nonce size).

TABLE 3

XMSS Signature Size

| Field | Previous Signature Size | Current Signature Size |
|---|---|---|
| idx_sig | 4 bytes | 4 bytes |
| r | 32 bytes | 32 bytes |
| WOTS signature | 2,144 bytes | 2,144 bytes |
| Auth. Path | 320 bytes | 320 bytes |
| Nonce | 8 bytes | — |
| Total | 2,508 bytes | 2,500 bytes |

Figure 11:
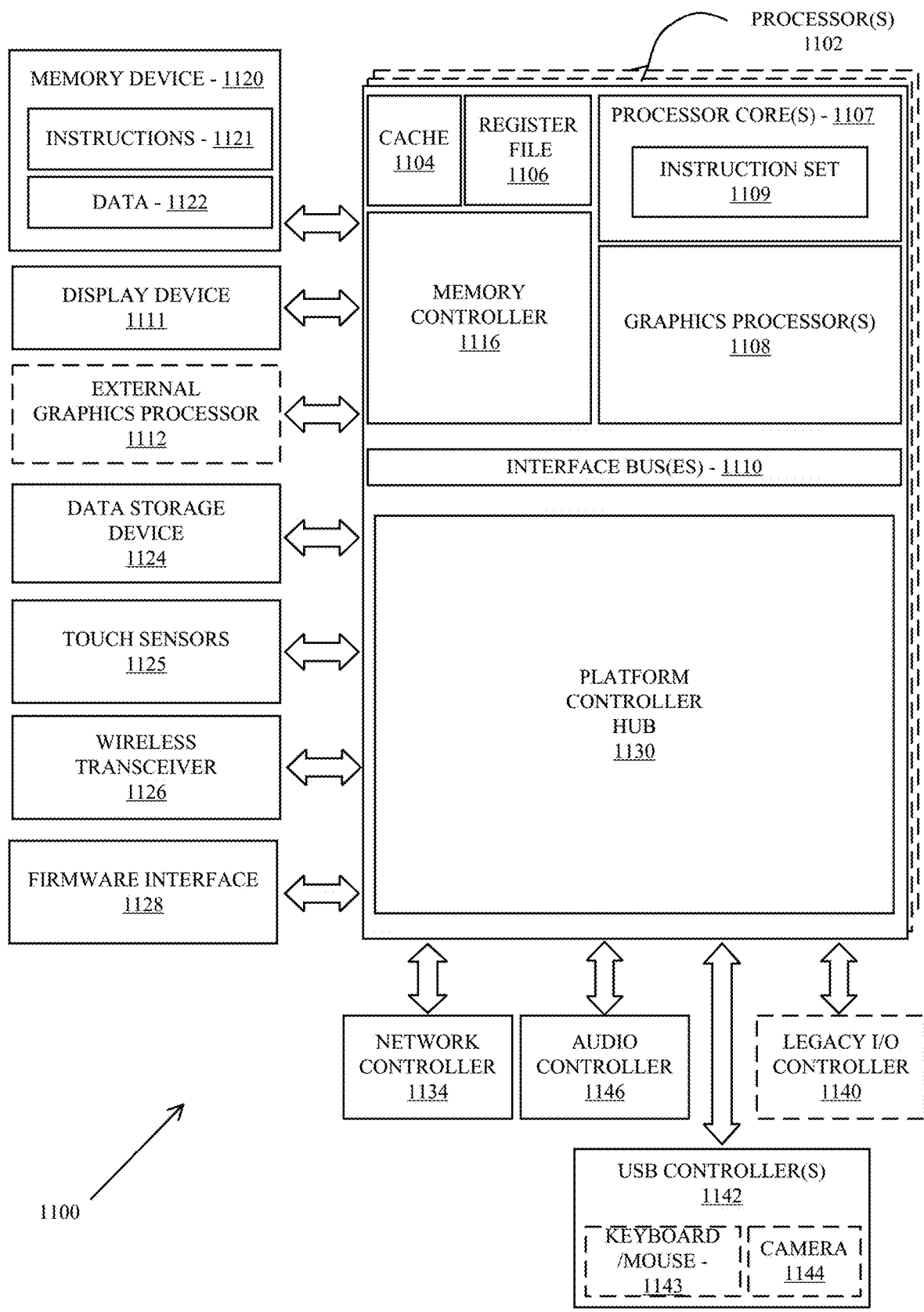
FIG. 11 is a schematic illustration of a computing architecture which may be adapted to implement adversarial training of neural networks using information about activation path differentials in accordance with some examples.

FIG. 11 illustrates an embodiment of an exemplary computing architecture that may be suitable for implementing various embodiments as previously described. In various embodiments, the computing architecture 1100 may comprise or be implemented as part of an electronic device. In some embodiments, the computing architecture 1100 may be representative, for example of a computer system that implements one or more components of the operating environments described above. In some embodiments, computing architecture 1100 may be representative of one or more portions or components of a DNN training system that implement one or more techniques described herein. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 1100. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1100 includes various common computing elements, such as one or more processors, multi-core processors, co-processors, memory units, chip-sets, controllers, peripherals, interfaces, oscillators, timing devices, video cards, audio cards, multimedia input/output (I/O) components, power supplies, and so forth. The embodiments, however, are not limited to implementation by the computing architecture 1100.

As shown in FIG. 11, the computing architecture 1100 includes one or more processors 1102 and one or more graphics processors 1108, and may be a single processor desktop system, a multiprocessor workstation system, or a server system having a large number of processors 1102 or processor cores 1107. In on embodiment, the system 1100 is a processing platform incorporated within a system-on-a-chip (SoC or SOC) integrated circuit for use in mobile, handheld, or embedded devices.

An embodiment of system 1100 can include, or be incorporated within a server-based gaming platform, a game console, including a game and media console, a mobile gaming console, a handheld game console, or an online game console. In some embodiments system 1100 is a mobile phone, smart phone, tablet computing device or mobile Internet device. Data processing system 1100 can also include, couple with, or be integrated within a wearable device, such as a smart watch wearable device, smart eyewear device, augmented reality device, or virtual reality device. In some embodiments, data processing system 1100 is a television or set top box device having one or more processors 1102 and a graphical interface generated by one or more graphics processors 1108.

In some embodiments, the one or more processors 1102 each include one or more processor cores 1107 to process instructions which, when executed, perform operations for system and user software. In some embodiments, each of the one or more processor cores 1107 is configured to process a specific instruction set 1109. In some embodiments, instruction set 1109 may facilitate Complex Instruction Set Computing (CISC), Reduced Instruction Set Computing (RISC), or computing via a Very Long Instruction Word (VLIW). Multiple processor cores 1107 may each process a different instruction set 1109, which may include instructions to facilitate the emulation of other instruction sets. Processor core 1107 may also include other processing devices, such a Digital Signal Processor (DSP).

In some embodiments, the processor 1102 includes cache memory 1104. Depending on the architecture, the processor 1102 can have a single internal cache or multiple levels of internal cache. In some embodiments, the cache memory is shared among various components of the processor 1102. In some embodiments, the processor 1102 also uses an external cache (e.g., a Level-3 (L3) cache or Last Level Cache (LLC)) (not shown), which may be shared among processor cores 1107 using known cache coherency techniques. A register file 1106 is additionally included in processor 1102 which may include different types of registers for storing different types of data (e.g., integer registers, floating point registers, status registers, and an instruction pointer register). Some registers may be general-purpose registers, while other registers may be specific to the design of the processor 1102.

In some embodiments, one or more processor(s) 1102 are coupled with one or more interface bus(es) 1110 to transmit communication signals such as address, data, or control signals between processor 1102 and other components in the system. The interface bus 1110, in one embodiment, can be a processor bus, such as a version of the Direct Media Interface (DMI) bus. However, processor busses are not limited to the DMI bus, and may include one or more Peripheral Component Interconnect buses (e.g., PCI, PCI Express), memory busses, or other types of interface busses. In one embodiment the processor(s) 1102 include an integrated memory controller 1116 and a platform controller hub 1130. The memory controller 1116 facilitates communication between a memory device and other components of the system 1100, while the platform controller hub (PCH) 1130 provides connections to I/O devices via a local I/O bus.

Memory device 1120 can be a dynamic random-access memory (DRAM) device, a static random-access memory (SRAM) device, flash memory device, phase-change memory device, or some other memory device having suitable performance to serve as process memory. In one embodiment the memory device 1120 can operate as system memory for the system 1100, to store data 1122 and instructions 1121 for use when the one or more processors 1102 executes an application or process. Memory controller hub 1116 also couples with an optional external graphics processor 1112, which may communicate with the one or more graphics processors 1108 in processors 1102 to perform graphics and media operations. In some embodiments a display device 1111 can connect to the processor(s) 1102. The display device 1111 can be one or more of an internal display device, as in a mobile electronic device or a laptop device or an external display device attached via a display interface (e.g., DisplayPort, etc.). In one embodiment the display device 1111 can be a head mounted display (HMD) such as a stereoscopic display device for use in virtual reality (VR) applications or augmented reality (AR) applications.

In some embodiments the platform controller hub 1130 enables peripherals to connect to memory device 1120 and processor 1102 via a high-speed I/O bus. The I/O peripherals include, but are not limited to, an audio controller 1146, a network controller 1134, a firmware interface 1128, a wireless transceiver 1126, touch sensors 1125, a data storage device 1124 (e.g., hard disk drive, flash memory, etc.). The data storage device 1124 can connect via a storage interface (e.g., SATA) or via a peripheral bus, such as a Peripheral Component Interconnect bus (e.g., PCI, PCI Express). The touch sensors 1125 can include touch screen sensors, pressure sensors, or fingerprint sensors. The wireless transceiver 1126 can be a Wi-Fi transceiver, a Bluetooth transceiver, or a mobile network transceiver such as a 3G, 4G, or Long Term Evolution (LTE) transceiver. The firmware interface 1128 enables communication with system firmware, and can be, for example, a unified extensible firmware interface (UEFI). The network controller 1134 can enable a network connection to a wired network. In some embodiments, a high-performance network controller (not shown) couples with the interface bus 1110. The audio controller 1146, in one embodiment, is a multi-channel high definition audio controller. In one embodiment the system 1100 includes an optional legacy I/O controller 1140 for coupling legacy (e.g., Personal System 2 (PS/2)) devices to the system. The platform controller hub 1130 can also connect to one or more Universal Serial Bus (USB) controllers 1142 connect input devices, such as keyboard and mouse 1143 combinations, a camera 1144, or other USB input devices.

The following pertains to further examples.

Example 1 is an apparatus, comprising accelerator logic to pre-compute at least a portion of a message representative, hash logic to generate the message representative based on an input message; and signature logic to generate a signature to be transmitted in association with the message representative, the signature logic to apply a hash-based signature scheme to a private key to generate the signature comprising a public key; and determine whether the message representative satisfies a target threshold allocation of computational costs between a cost to generate the signature and a cost to verify the signature.

In Example 2, the subject matter of Example 1 can optionally include an arrangement in which the hash logic is to compute the message representative of the input message using a Winterniz One Time Signature (WOTS) scheme that invokes a secure hash algorithm (SHA) hash function.

In Example 3, the subject matter of any one of Examples 1-2 optionally include an arrangement in which the hash logic is to generate a first random nonce; and generate an extended Merkel signature scheme (XMSS) parameter, r, using the first random nonce as a portion of an input to a SHA function.

In Example 4, the subject matter of any one of Examples 1-3 can optionally include an arrangement in which the hash logic is to generate the message representative based at least in part on the XMSS parameter r.

In Example 5, the subject matter of any one of Examples 1-4 can optionally include an arrangement in which the accelerator logic is to precompute a first intermediate hash value based on a predetermined input sequence, a buffer input, and an index input; and store the first intermediate hash value in a computer-readable memory.

In Example 6, the subject matter of any one of Examples 1-5 can optionally include an arrangement in which the accelerator logic is to precompute a second intermediate hash value based on the predetermined input sequence input and the buffer input; and store the second intermediate hash value in the computer-readable memory.

In Example 7, the subject matter of any one of Examples 1-6 can optionally include an arrangement in which the signature logic is to use at least one of the first intermediate value or the second intermediate hash value to generate the signature.

Example 8 is an computer-implemented method, comprising pre-computing at least a portion of a message representative; generating the message representative based on an input message; generating a signature to be transmitted in association with the message representative, the signature logic to apply a hash-based signature scheme to a private key to generate the signature comprising a public key; and determining whether the message representative satisfies a target threshold allocation of computational costs between a cost to generate the signature and a cost to verify the signature.

In Example 9, the subject matter of Example 8 can optionally include computing the message representative of the input message using a Winterniz One Time Signature (WOTS) scheme that invokes a secure hash algorithm (SHA) hash function.

In Example 10, the subject matter of any one of Examples 8-9 can optionally include generating a first random nonce; and generating an extended Merkel signature scheme (XMSS) parameter, r, using the first random nonce as a portion of an input to a SHA function.

In Example 11, the subject matter of any one of Examples 8-10 can optionally include generating the message representative based at least in part on the XMSS parameter r.

In Example 12, the subject matter of any one of Examples 8-11 can optionally include precomputing a first intermediate hash value based on a predetermined input sequence, a buffer input, and an index input; and storing the first intermediate hash value in a computer-readable memory.

In Example 13, the subject matter of any one of Examples 8-12 can optionally include precomputing a second intermediate hash value based on the predetermined input sequence and the buffer input; and storing the second intermediate hash value in the computer-readable memory.

In Example 14, the subject matter of any one of Examples 8-13 can optionally include using at least one of the first intermediate value or the second intermediate hash value to generate the signature.

Example 15 is a computer-readable medium comprising instructions which, when executed by a processor, configure the processor to perform operations, comprising re-computing at least a portion of a message representative; generating the message representative based on an input message; generating a signature to be transmitted in association with the message representative, the signature logic to apply a hash-based signature scheme to a private key to generate the signature comprising a public key; and determining whether the message representative satisfies a target threshold allocation of computational costs between a cost to generate the signature and a cost to verify the signature.

In Example 16, the subject matter of Example 15 can optionally include instructions which, when executed by the processor, configure the processor to perform operations, comprising computing the message representative of the input message using a Winterniz One Time Signature (WOTS) scheme that invokes a secure hash algorithm (SHA) hash function.

In Example 17, the subject matter of any one of Examples 15-16 can optionally include instructions which, when executed by the processor, configure the processor to perform operations, comprising generating a first random nonce; and generating an extended Merkel signature scheme (XMSS) parameter, r, using the first random nonce as a portion of an input to a SHA function.

In Example 18, the subject matter of any one of Examples 15-17 can optionally include instructions which, when executed by the processor, configure the processor to perform operations, comprising generating the message representative based at least in part on the XMSS parameter r.

In Example 19, the subject matter of any one of Examples 15-18 can optionally include instructions which, when executed by the processor, configure the processor to perform operations, comprising precomputing a first intermediate hash value based on a predetermined input sequence, a buffer input, and an index input; and storing the first intermediate hash value in a computer-readable memory.

In Example 20, the subject matter of any one of Examples 15-19 can optionally include instructions which, when executed by the processor, configure the processor to perform operations, comprising precomputing a second intermediate hash value based on the predetermined input sequence and the buffer input; and storing the second intermediate hash value in the computer-readable memory.

In Example 21, the subject matter of any one of Examples 15-20 can optionally include instructions which, when executed by the processor, configure the processor to perform operations, comprising using at least one of the first intermediate value or the second intermediate hash value to generate the signature.

The above Detailed Description includes references to the accompanying drawings, which form a part of the Detailed Description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In addition "a set of" includes one or more elements. In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second," "third," etc. are used merely as labels, and are not intended to suggest a numerical order for their objects.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and examples are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this is merely an example of a computer readable medium and examples are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and examples are not limited in this respect.

Some of the methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

In the description and claims, the terms coupled and connected, along with their derivatives, may be used. In particular examples, connected may be used to indicate that two or more elements are in direct physical or electrical contact with each other. Coupled may mean that two or more elements are in direct physical or electrical contact. However, coupled may also mean that two or more elements may not be in direct contact with each other, but yet may still cooperate or interact with each other.

Reference in the specification to "one example" or "some examples" means that a particular feature, structure, or characteristic described in connection with the example is included in at least an implementation. The appearances of the phrase "in one example" in various places in the specification may or may not be all referring to the same example.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with each claim standing on its own as a separate embodiment. The scope of the embodiments disclosed herein is to be determined with reference to the appended claims, along with the full scope of equivalents to which such claims are entitled.

Although examples have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. An apparatus, comprising:
a hardware processor to:
  pre-compute at least a portion of a message representative;
  generate a first random nonce; and
  generate an extended Merkel signature scheme (XMSS) parameter, r, by providing the first random nonce concatenated with an input to a first secure hash algorithm (SHA) hash function, wherein a padding buffer of the parameter r is reduced to comprise the random nonce;
  compute the message representative of the input message using a Winternitz One Time Signature (WOTS) scheme that invokes a secure hash algorithm (SHA) hash function based on an input message concatenated with the XMSS parameter, r;
  generate a signature to be transmitted in association with the message representative, the signature logic to apply a hash-based signature scheme to a private key to generate the signature comprising a public key; and
  determine whether the message representative satisfies a target threshold allocation of computational costs between a cost to generate the signature and a cost to verify the signature.

2. The apparatus of claim 1, the hardware processor to:
precompute a first intermediate hash value based on a predetermined input sequence, a buffer input, and an index input; and
store the first intermediate hash value in a computer-readable memory.

3. The apparatus of claim 2, the hardware processor to:
precompute a second intermediate hash value based on the predetermined input sequence input and the buffer input; and
store the second intermediate hash value in the computer-readable memory.

4. The apparatus of claim 3, the hardware processor to:
use at least one of the first intermediate value or the second intermediate hash value to generate the signature.

5. A computer-implemented method, comprising:
pre-computing at least a portion of a message representative;
generating a first random nonce; and
generating an extended Merkel signature scheme (XMSS) parameter, r, by providing the first random nonce concatenated with an input to a first secure hash algorithm (SHA) hash function, wherein a padding buffer of the parameter r is reduced to comprise the random nonce;
computing the message representative of the input message using a Winternitz One Time Signature (WOTS) scheme that invokes a secure hash algorithm (SHA) hash function based on an input message concatenated with the XMSS parameter, r;
generating a signature to be transmitted in association with the message representative, the signature logic to apply a hash-based signature scheme to a private key to generate the signature comprising a public key; and determining whether the message representative satisfies a target threshold allocation of computational costs between a cost to generate the signature and a cost to verify the signature.

6. The method of claim 5, further comprising:

precomputing a first intermediate hash value based on a predetermined input sequence, a buffer input, and an index input; and storing the first intermediate hash value in a computer-readable memory.

7. The method of claim 6, further comprising: precomputing a second intermediate hash value based on the predetermined input sequence and the buffer input; and storing the second intermediate hash value in the computer-readable memory.

8. The method of claim 6, further comprising:

using at least one of the first intermediate value or the second intermediate hash value to generate the signature.

9. A non-transitory computer-readable medium comprising instructions which, when executed by a processor, configure the processor to perform operations, comprising:

generating a first random nonce; and generating an extended Merkel signature scheme (XMSS) parameter, r, by providing the first random nonce concatenated with an input to a first secure hash algorithm (SHA) hash function, wherein a padding buffer of the parameter r is reduced to comprise the random nonce; generating the message representative based on an input message;

computing the message representative of the input message using a Winternitz One Time Signature (WOTS) scheme that invokes a secure hash algorithm (SHA) hash function based on an input message concatenated with the XMSS parameter, r;

generating a signature to be transmitted in association with the message representative, the signature logic to apply a hash-based signature scheme to a private key to generate the signature comprising a public key; and determining whether the message representative satisfies a target threshold allocation of computational costs between a cost to generate the signature and a cost to verify the signature.

10. The non-transitory computer-readable medium of claim 9, further comprising instructions which, when executed by the processor, configure the processor to perform operations, comprising: precomputing a first intermediate hash value based on a predetermined input sequence, a buffer input, and an index input; and storing the first intermediate hash value in a computer-readable memory.

11. The non-transitory computer-readable medium of claim 10, further comprising instructions which, when executed by the processor, configure the processor to perform operations, comprising:

precomputing a second intermediate hash value based on the predetermined input sequence and the buffer input; and storing the second intermediate hash value in the computer-readable memory.

12. The non-transitory computer-readable medium of claim 11, further comprising instructions which, when executed by the processor, configure the processor to perform operations, comprising:

using at least one of the first intermediate value or the second intermediate hash value to generate the signature.

* * * * *